United States Patent [19]

D'Ercole

[11] Patent Number: 5,588,917
[45] Date of Patent: Dec. 31, 1996

[54] COUPLING WITH DUAL TORQUE TRANSMISSION PATHS

[75] Inventor: Steve D'Ercole, Glenn Burnie, Md.

[73] Assignee: KOP-Flex, Inc., Baltimore, Md.

[21] Appl. No.: 339,895

[22] Filed: Nov. 14, 1994

[51] Int. Cl.[6] .............................. F16D 3/56; F16D 3/64; F16D 3/78
[52] U.S. Cl. ........................ 464/79; 464/147; 464/160
[58] Field of Search ............................ 464/79, 80, 82, 464/73, 147, 177, 160, 99

[56] References Cited

U.S. PATENT DOCUMENTS

| | | |
|---|---|---|
| 1,414,411 | 5/1922 | Herreshoff et al. . |
| 1,605,356 | 11/1926 | Leipert . |
| 1,606,514 | 11/1926 | Crist . |
| 1,639,644 | 8/1927 | Baumann . |
| 2,647,380 | 8/1953 | Troeger et al. . |
| 3,091,979 | 6/1963 | Schaefer, Jr. et al. ............... 464/79 X |
| 4,133,188 | 1/1979 | Cartwright ............................ 464/99 |
| 4,265,099 | 5/1981 | Johnson et al. . |
| 4,276,758 | 7/1981 | Coman et al. ....................... 464/99 X |
| 4,560,364 | 12/1985 | Cohen ................................ 464/160 X |
| 5,000,722 | 3/1991 | Zilberman . |
| 5,407,386 | 4/1995 | Kish et al. ......................... 464/160 X |
| 5,474,499 | 12/1995 | Olson ................................ 464/160 X |

FOREIGN PATENT DOCUMENTS

| | | |
|---|---|---|
| 454924 | 3/1949 | Canada . |
| 888339 | 8/1953 | Germany . |
| 1142393 | 2/1969 | United Kingdom .................... 464/73 |

Primary Examiner—Daniel P. Stodola
Assistant Examiner—Emmanuel M. Marcelo
Attorney, Agent, or Firm—Cushman Darby & Cushman IP Group of Pillsbury Madison & Sutro LLP

[57] ABSTRACT

A coupling system provided with a dual torque transmitting arrangement to provide compensation for axial misalignment between a drive shaft and a driven shaft where a primary flexible coupling member transmits torque between the drive shaft and the driven shaft preferably through a sleeve also coupled with a flexible coupling member to the driven shaft; the flexible member includes a gear transmission system for transmitting torque in the event of severe torsional overload of the flexible member which causes the gear teeth of the secondary coupler to engage and transmit torque from the drive to the driven shaft.

6 Claims, 3 Drawing Sheets

FIG. I

COUPLING WITH DUAL TORQUE TRANSMISSION PATHS

FIELD OF THE INVENTION

The present invention relates to a power transmission coupling, including a flexible type provided for accommodating a primary torque path and misalignment between a driving and a driven shaft, while incorporating a secondary torque path connection, which becomes active only when the torque in the system exceeds a predetermined value.

BACKGROUND OF THE INVENTION

Flexible couplings for transmitting torque between a driving and a driven shaft are known. See for example, U.S. Pat. No. 5,000,722 which is commonly assigned and the disclosure of which is incorporated herein by reference. Such diaphragm type couplings are typically employed to transmit torque from a drive to a driven shaft while absorbing and sometimes dissipating the effects of misalignment. In a number of applications, a flexible coupling is designed to operate under relatively steady state conditions in terms of the torque applied and transmitted.. However, in certain specific applications, it is necessary to assure continued operation of the coupling even though occasionally, abnormally nigh torque values are imposed on the coupling even over a short time span. It is practically not feasible or cost effective to design a conventional coupling that would satisfy both sets of conditions of high flexiblility and high torque capacity and yet operate satisfactorily in its normal operating state. For a flexible coupling, such as that disclosed in U.S. Pat. No. 5,000,722, undesirable compromises in the flexibility of the coupling would have to be imposed, which would result in a loss of flexibility which would itself tend to cause premature failure due to misalignment, or would result in undesirable, high magnitude reactor loads onto the connected equipment.

SUMMARY OF THE INVENTION

The present invention has been designed to compensate for this drawback of the prior art and to provide a coupling which will operate with a reasonably broad range of flexibility in terms of misalignment over a normal torque transmission level and yet be able to continue to operate by temporarily engaging a secondary coupling system where extremely high torque values are imposed on the flexible coupling. In one embodiment, a primary flexible element coupling is connected to an adaptor ring to the output end of a drive shaft. The secondary overload coupling system including a guard sleeve having an interior geared surface about its interior circumference cooperates with a geared interface provided either directly or through an intermediate element on the axially inner member of the primary flexible element. A spacer sleeve may be provided to couple the foregoing coupling system to a duplicate system which is attached in turn to the end of a driven shaft.

With this arrangement, under normal operating loads, the primary flexible element will suffice to accommodate a relatively wide range of misalignments within certain torque loads. However, in the event of severely high torque loads on the order of 4–10 times higher than the normal operating range, the secondary coupling system will effect torque transmission from the drive to the driven shaft and reduce the torque on the primary flexible element thus preventing failure in most circumstances of the primary flexible element until the temporary excess torque is relieved. With this arrangement, the secondary coupling system will not function or interfere with the primary flexible member's torque transmission function or capacity during normal operation. In extreme torque conditions, both the primary flexible member and the secondary coupling gear teeth will transmit torque with the major portion of the excess load carried by the gear teeth to avoid damage to the primary flexible member coupling.

The foregoing and other advantages will become apparent to those skilled in this field as consideration is given to the following detailed description taken in conjunction with the accompanying drawings, in which:

DETAILED DESCRIPTION OF THE INVENTION

Figure 1:
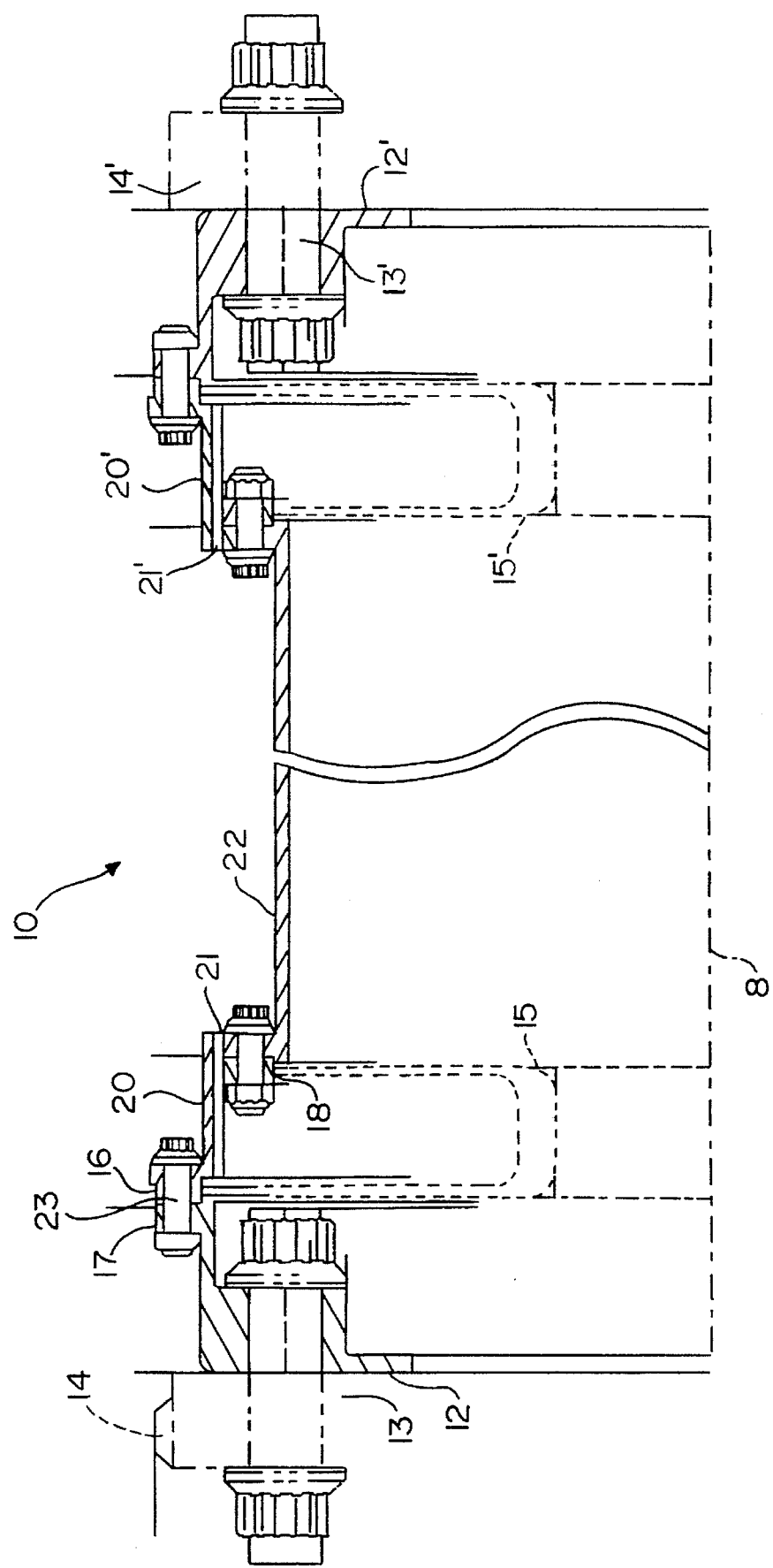
FIG. 1 is a sectional view, transverse to the axis of rotation of a coupling arrangement of the present invention.

Referring now to the drawings, wherein like numerals designate corresponding parts throughout the several views, there is shown in FIG. 1, the flexible coupling system 10 with a secondary coupling arrangement of the present invention.

In the coupling system 10, the end 14 of a drive shaft is bolted as at 13 to an adaptor ring 12 which, in turn, is provided with a plurality of apertures 17 circumferentially thereof about the axis of rotation 8—8 for bolting to a ring 16 formed integrally with primary flexible diaphragm 15. The axially inner ring 18 of diaphragm 15 is bolted, in the illustrated embodiment, to a flange 21 protruding peripherally from spacer sleeve 22. Also attached through a bolt 23 is a guard sleeve 20. On the right hand side of FIG. 1, identical elements corresponding to the coupling 10 described above are provided and the corresponding elements are designated by the primed numerals with the exception that the driven shaft is designated by the numeral 14'. It will be apparent, however, to those skilled in the art that the drive train can operate just as effectively with the drive shaft at 14' and the driven shaft at 14.

Figure 2:
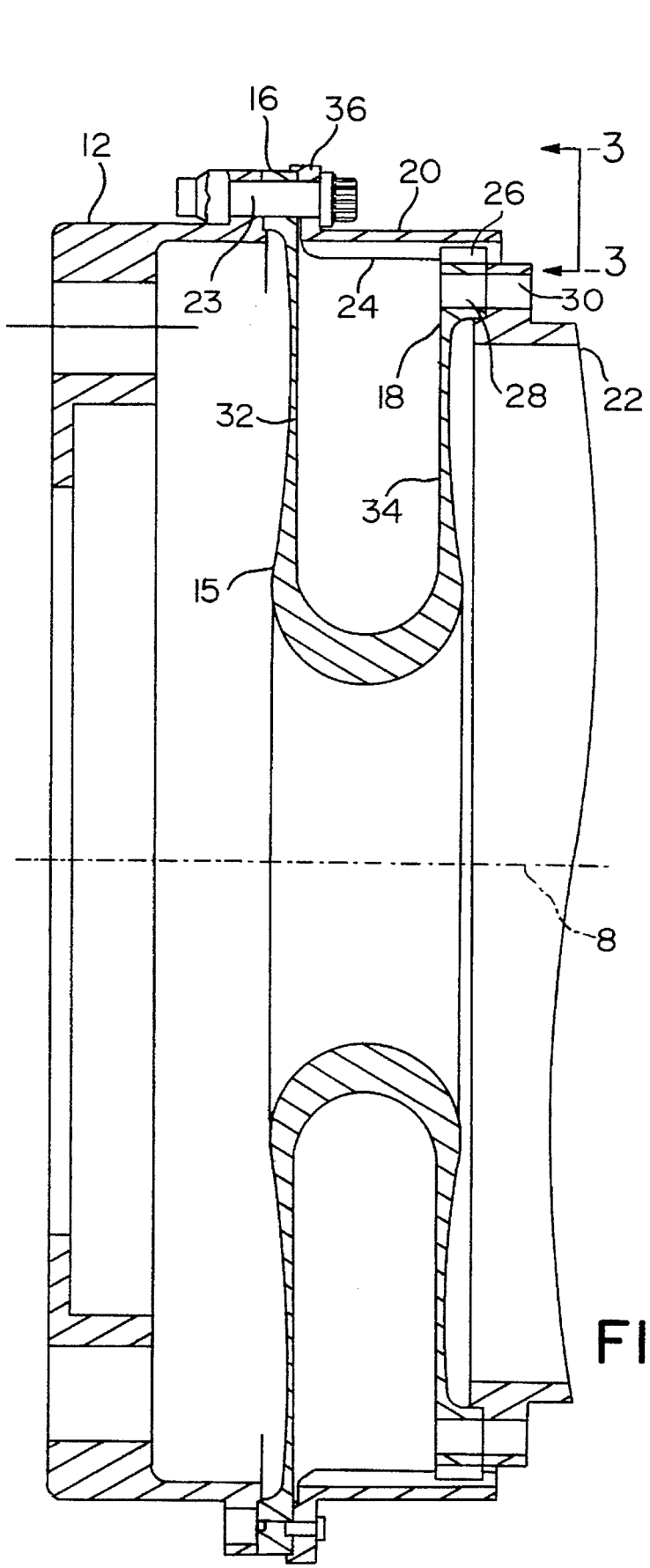
FIG. 2 is a detailed view of one end of the coupling of FIG. 1, but with the connecting bolts removed.
Figure 3:
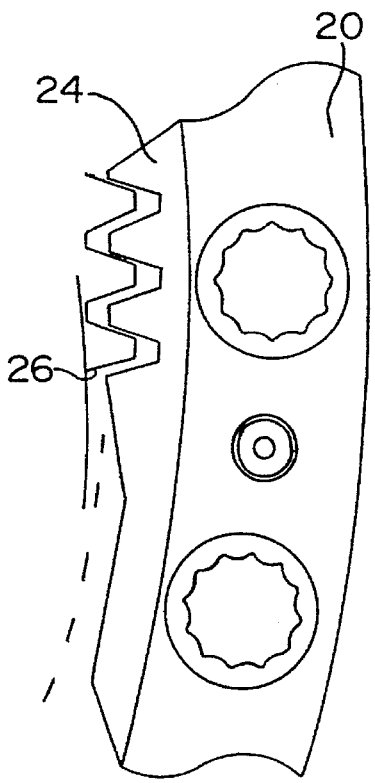
FIG. 3 is a view along lines 3—3 of FIG. 2.

Turning now to FIG. 2, there is provided an enlarged detailed view of the primary flexible coupling and the secondary coupling of the present invention. The guard sleeve 20 is provided about its interior with gear teeth 24 shown in enlarged view in the sectional view of FIG. 3. The axially inner ring 18 of diaphragm 15 on its exterior surface is provided with gear teeth 26 about its circumferential periphery. The ring member 18, which has a smaller radial position, is provided with a plurality of apertures 28 about its circumference while the flange of sleeve 22 is provided with alignable apertures 30 for cooperating with the apertures 28 to receive a bolt as shown in FIG. 1 to secure the sleeve 22 to the ring 18 of diaphragm 15. With this arrangement, it will be apparent that due to the flexibility of the radially extending arms 32 and 34 of the diaphragm 15, misalignment can be accommodated during torque transmission through the diaphragm 15 up to a predetermined torsional reflection of the metal diaphragm 15. At that point in the torque loading, the teeth 26 will engage in torque transmitting relation with the teeth 24 of the guard sleeve 20. The axially outer end of the guard sleeve 20 is provided with a radially projecting flange 36 which, in turn, is provided with a plurality of apertures alignable with the apertures of the ring 16 and the adaptor ring 12 to enable ready assembly with a bolt in each of the aligned apertures as shown in FIGS. 1 and 2.

Also, it will be noted from FIG. 2 that the axial length of the inner teeth 24 of the guard sleeve 20 is several times the axial width of the teeth 26 on the ring 18 of the diaphragm 15. This will facilitate both assembly and operation of the flexible coupling of the present invention as well as installation and removal in a broader range of operating environments.

Figure 4A:
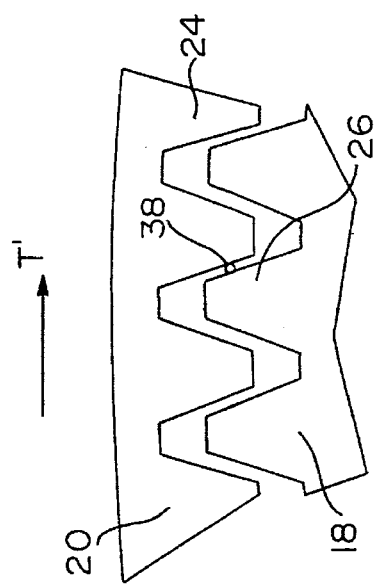
FIGS. 4a–4c are views of various positions of the secondary gear teeth coupling of the present invention, under various torsional loads.

According to the present invention, the teeth 26 of the ring member 18 of the flexible diaphragm 15 will normally not transmit any torque as illustrated in FIG. 4A where both gaps 38 and 39 will exist between the teeth 26 of the ring 18 and teeth 24 of the guard sleeve 20. This will exist while the drive and driven shafts are at rest. With this arrangement, during coupling installation, where angular misalignment is present, locking up of the teeth and therefore of the diaphragm will be avoided so that the maximum flexibility provided by the diaphragm 15 will be achievable and uninhibited.

Figure 4B:
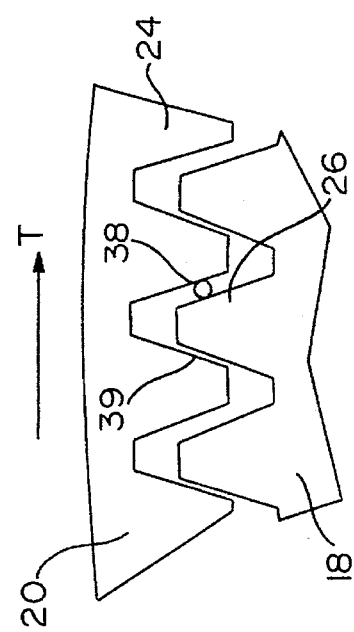
Figure 4C:
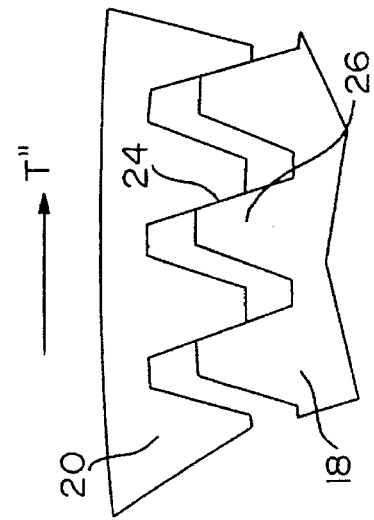

At a norminal torque T as shown in FIG. 4B, the gap 38 will diminish somewhat during normal operation, but the teeth 24 and 26 will not engage, thereby preserving full coupling flexibility. In certain other circumstances, such as illustrated in FIG. 4C where the torque reaches the predetermined torque T' of the flexible coupling, the teeth 26 and 24 will become fully engaged to transmit a portion of the overload from the drive shaft to the driven shaft. The main torque carrier becomes guard 20, with a torque portion remaining for the flexible diaphragm. The specific stress analysis of this condition indicates that the diaphragm will not fail up to the maximum possible torque in the system, T". Of course, as will be appreciated by those skilled in this technology, should the metal diaphragm fail if T" is amended, the gear teeth sets 24 and 26 can be relied upon to continue to deliver torque from the drive to the driven shafts 14 and 14'.

It will also be apparent to those skilled in this field that the driven shaft may be coupled directly to the ring 18 of the flexible diaphragm 14 and there are a number of applications where such an arrangement may be desired.

The elements of the present invention are typically made of steel but it will be apparent that modifications in this regard as well as the arrangement of parts may be made without departing from the spirit and scope of this invention as defined in the appended claims.

What is claimed is:

1. A coupling for accommodating misalignment between the axes of a drive shaft and a driven shaft, comprising:

a drive connector having an axis of rotation and being located at an end of the drive shaft, an annular flexible coupler having a first member connected to said drive connector and a second axially spaced apart member connected to the driven shaft so as to transmit torque from the drive shaft to the driven shaft, an annular secondary coupler having a first member connected to said drive connector and a second member located adjacent said second member of said annular flexible coupler for selectively engaging in torque transmitting relation with said second member of said annular flexible coupler when said annular flexible coupler is torsionally deflected beyond a threshold limit so as to continue torque transmission through said second member of said annular flexible coupler to the driven shaft, said drive connector comprising a ring having apertures spaced circumferentially about said ring for receiving bolts to connect the end of the drive shaft to said annular flexible coupler, said annular secondary coupler comprising a sleeve having an interior surface, said interior surface having gear teeth, said sleeve having at one end a radially extending flange provided with a plurality of apertures aligned with said apertures of said ring, said second member of said annular flexible coupler including a radially outer surface formed with gear teeth engageable with said gear teeth on said interior surface of said sleeve.

2. The invention as claimed in claim 1 wherein said annular flexible coupler comprises a first ring member and a second ring member, said first and second ring members each having a plurality of apertures for receiving mounting bolts, said first and second ring members being connected by a continuous wall having:

a first portion extending radially inwardly from one of said ring portions towards said axis of rotation, a second portion connecting said first portion with a third portion, said second portion being arcuately curved, said third portion extending radially inwardly from said second ring member to said second portion.

3. The invention as claimed in claim 1 wherein said annular secondary coupler comprises a sleeve having an interior surface, said interior surface having gear teeth.

4. The invention as claimed in claim 1, wherein said second member of said annular flexible coupler is provided with a plurality of circumferentially spaced apertures for establishing a connection to another element.

5. The invention as claimed in claim 4, wherein said another element is a spacer sleeve, said spacer sleeve having a first end having a plurality of axially aligned apertures spaced about an axis of said spacer sleeve for alignment with said apertures of said second member of said flexible coupler, and a second end having a corresponding number of apertures axially aligned for cooperation with apertures of another annular flexible coupler.

6. The invention as claimed in claim 1 wherein said annular flexible coupler comprises a diaphragm body connecting said first and second members about a substantially common axis of rotation, said diaphragm body having a pair of outer peripheral portions each joined to a respective one of said first and second members, said diaphragm body extending continuously from one of said members radially inwardly toward said common axis to define a smoothly curving inner portion and from said inner portion to said other of said first and second members.

* * * * *